United States Patent
Noh et al.

(10) Patent No.: US 6,747,712 B2
(45) Date of Patent: Jun. 8, 2004

(54) FRINGE FIELD SWITCHING LIQUID CRYSTAL DISPLAY DEVICE AND METHOD FOR MANUFACTURING THE SAME

(75) Inventors: Jeong Dong Noh, Busan (KR); Seung Hee Lee, Kyoungki-do (KR)

(73) Assignee: Boe-Hydis Technology Co., Ltd., Kyoungki-do (KR)

( * ) Notice: Subject to any disclaimer, the term of this patent is extended or adjusted under 35 U.S.C. 154(b) by 35 days.

(21) Appl. No.: 10/157,518

(22) Filed: May 29, 2002

(65) Prior Publication Data

US 2002/0180920 A1 Dec. 5, 2002

(30) Foreign Application Priority Data

May 31, 2001 (KR) .......................... 2001-30552

(51) Int. Cl.[7] ............................ G02F 1/1343
(52) U.S. Cl. ................ 349/39; 349/43; 349/141
(58) Field of Search .................. 349/39, 43, 141, 349/143; 257/59, 72

(56) References Cited

U.S. PATENT DOCUMENTS 5,822,027 A * 10/1998 Shimada et al. ............. 349/39
6,014,190 A * 1/2000 Kim et al. ..................... 349/39
6,342,937 B2 * 1/2002 Hiroshi ....................... 349/141

* cited by examiner

*Primary Examiner*—Robert H. Kim
*Assistant Examiner*—Michael H. Caley
(74) *Attorney, Agent, or Firm*—Ladas & Parry (57) ABSTRACT

The present invention comprises an upper substrate; a data bus line and a storage capacitance bus line on a lower substrate; a gate bus line at the position of bisecting the unit pixel; a thin film transistor on the gate bus line; a counter electrode; and a pixel electrode. The pixel electrode comprises a frame shaped body unit formed on the edge in counter electrode and a plurality of slant slits arranged with a regular distance to divide the body unit into several parts, forming a predetermined angle with the gate bus line. The angle of slant slits in the pixel electrode is symmetric with respect to the gate bus line. The storage capacitance bus line is partially overlapped with both the upper edge of pixel electrode in one unit pixel and the lower edge of pixel electrode in the closest unit pixel. According to the present invention, the black matrix area is reduced by eliminating or minimizing the light leakage through modifying the pixel structure, thereby improving the aperture ration and transmittance.

20 Claims, 11 Drawing Sheets

FIG. 1

(PRIOR ART)

FRINGE FIELD SWITCHING LIQUID CRYSTAL DISPLAY DEVICE AND METHOD FOR MANUFACTURING THE SAME

BACKGROUND OF THE INVENTION

1. Field of the Invention

The present invention relates to a fringe field switching liquid crystal display device and a method for manufacturing the same and, more particularly, to a fringe field switching liquid crystal display device having improved aperture ratio and transmittance and a method for manufacturing the same.

2. Description of the Prior Art

A fringe field switching liquid crystal display device has been proposed to improve low aperture ratio and transmittance of In-Plane switching liquid crystal display device. In the fringe field switching liquid crystal display device, a counter electrode and a pixel electrode are formed of transparent conductor, and the distance is narrower than that of upper and lower substrates, thereby forming a fringe field between the electrodes.

The fringe field switching liquid crystal display device has a high aperture ratio and transmittance since most of the molecules are operated in a pixel region. However, when an electric field is formed between the counter and the pixel electrodes, liquid crystal molecules with refractive anisotropy are operated to a predetermined direction at the same time. Therefore, it can cause a color shift problem which causes a predetermined color to be expressed according to the viewing angle. The fringe field switching liquid crystal display device having the following structure has been proposed to solve the above and other problems.

Figure 1:
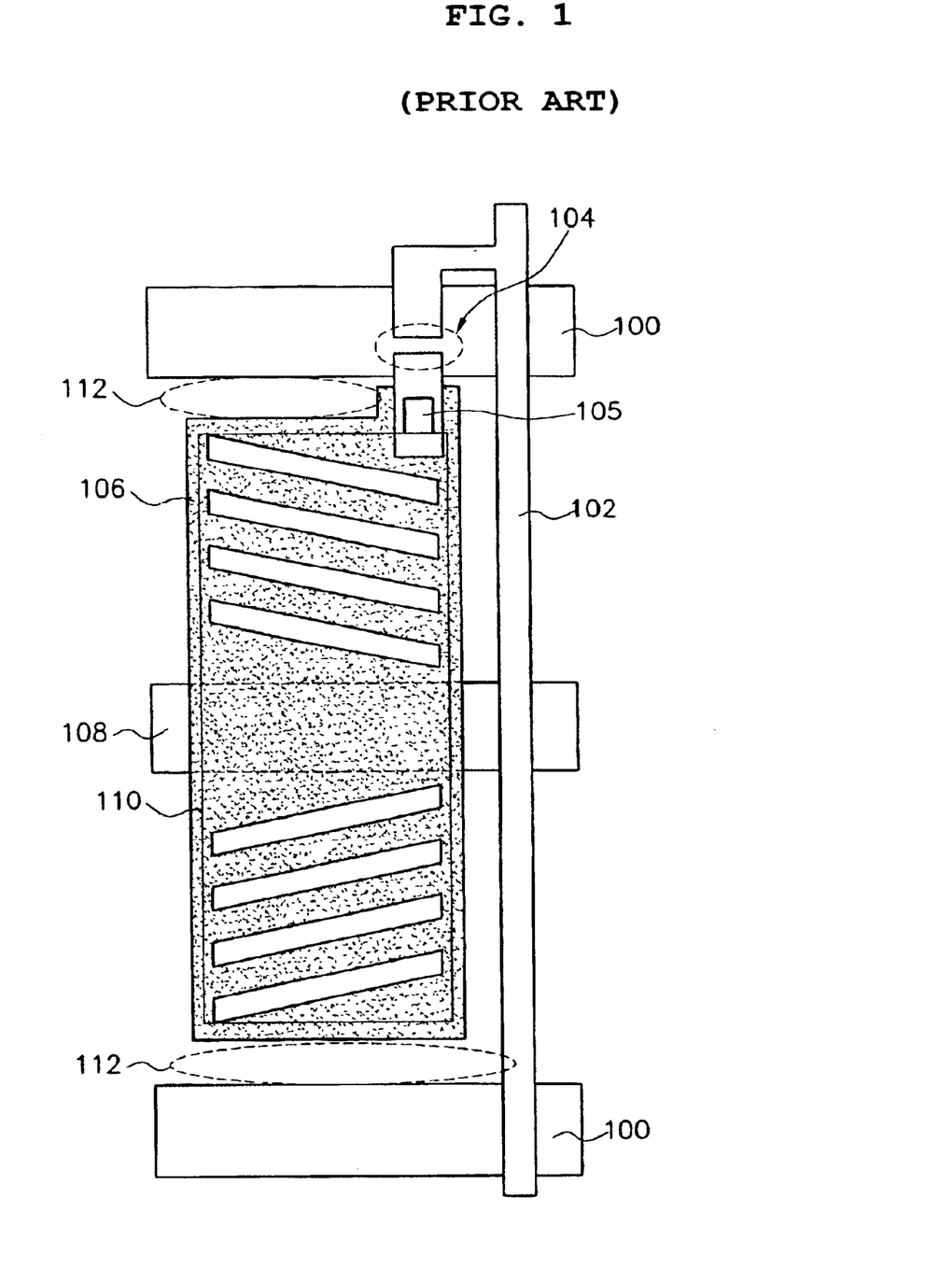
FIG. 1 is a top view of unit pixel in a fringe field switching liquid crystal display device according to a conventional art.

Referring to FIG. 1, a conventional fringe field switching liquid crystal display device has a structure that a storage capacitance bus line 108 is arranged at the position of bisecting a unit pixel defined by a gate bus line 100 and a data bus line 102. A thin film transistor 104 as a switching device is arranged at the intersection of the gate bus line 100 and the data bus line 102, and in the unit pixel, a counter electrode (not shown) is arranged to be overlapped with a pixel electrode 106.

The pixel electrode 106 is in contact with a source electrode in the thin film transistor 104 through a via hole 105, comprising a body unit formed in a frame shape and slant slits arranged with a regular distance to divide the body unit into several parts, forming a predetermined angle with the gate bus line 100. The slant slits are arranged symmetric with respect to the storage capacitance bus line 108. Therefore, the fringe field is also formed symmetric with respect to the storage capacitance bus line 108.

And, liquid crystal molecules are arranged symmetric with respect to the storage capacitance bus line 108, thereby the major axis and the minor axis of liquid crystal molecules are to be seen in any direction of screen. As a result, it is possible to compensate refractive anisotropy of liquid crystal molecule and prevent color shift.

However, the conventional fringe field switching liquid crystal display has a disadvantage that when a cross talk pattern signal is applied to panel, an electric field is formed on the region 112 between the edge of pixel electrode 106 and counter electrode (not shown) and the gate bus line 100 and data bus line 102, thereby generating undesirable light leakage.

In order to prevent this light leakage, as shown in FIG. 1, a method has been proposed that a large black matrix 110 is formed in a pixel region considering coupling margin and viewing angle. However, aperture ratio and brightness are lowered by the large black matrix.

Considering power consumption, it is required to improve aperture ratio, thereby increasing brightness in a BRIGHT state. However, the conventional art has a limitation in remarkably reducing the black matrix on upper substrate to improve aperture ratio of panel.

SUMMARY OF THE INVENTION

Therefore, the present invention has been made to solve the problems and an object of the present invention is to provide a fringe field switching liquid crystal display device having improved aperture ratio and transmittance and a method for manufacturing the same, wherein the pixel structure is modified to prevent light leakage and reduce or eliminate black matrix, having more slits by enlarging the size of pixel electrode.

In order to accomplish the object, the present invention comprises: an upper substrate; a data bus line and a storage capacitance bus line arranged on a lower substrate opposing to the upper substrate to define a unit pixel; a gate bus line arranged at the position of bisecting the unit pixel and to be parallel with the storage capacitance bus line; a thin film transistor arranged on the gate bus line; a counter electrode arranged in the unit pixel; and a pixel electrode overlapped with the counter electrode to form a fringe field and electrically contacted with the thin film transistor through a via hole, wherein the pixel electrode comprises a frame shaped body unit on the edge in the counter electrode and a plurality of slant slits arranged with a regular distance to divide the body unit into several parts, forming a predetermined angle with the gate bus line, and the angle of the slant slits in pixel electrode is symmetric with respect to the gate bus line, and the storage capacitance bus line is overlapped with both the upper edge of pixel electrode in one unit pixel and the lower edge of pixel electrode in the closest unit pixel.

The method for manufacturing a fringe field switching liquid crystal display according to the present invention comprises the steps of: forming a counter electrode on a transparent insulating layer; forming a storage capacitance bus line on upper and lower outer sides of the transparent insulating layer having the counter electrode to define a unit pixel; forming a gate bus line at the position of bisecting the unit pixel; forming an insulating layer on the transparent insulating substrate having the gate bus line and the storage capacitance bus line and then, forming an active layer on the insulating layer over the gate bus line; forming a data bus line and source/drain electrodes extended from the data bus line on the insulating layer having the active layer; forming a protective layer on the source/drain electrodes and on the data bus line and then, forming a via hole exposing a part of the source electrode; and forming a pixel electrode comprising a plurality of slits, being in contact with the source electrode through the via hole.

DETAILED DESCRIPTION OF THE INVENTION

The objects and features of the invention may be understood with reference to the following detailed description of an illustrative embodiment of the invention, taken together with the accompanying drawings.

Figure 2:
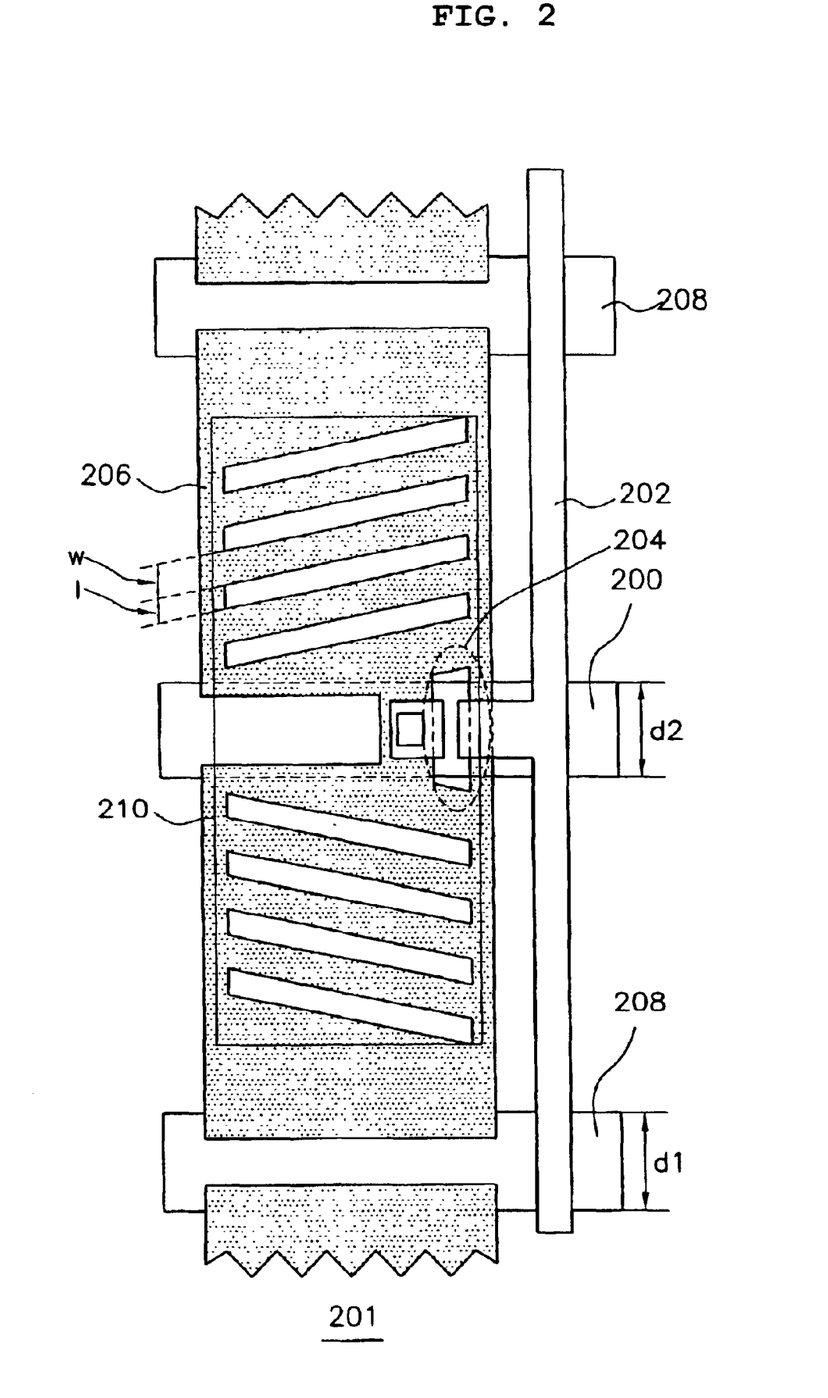
FIGS. 2 and 3 are top views of unit pixel in a fringe field switching liquid crystal display device according to the present invention.

Referring to FIG. 2, a fringe field switching liquid crystal display device of the present invention comprises: a black matrix 210 formed on an upper substrate (not shown); a data bus line 202 and a storage capacitance bus line 208 arranged on a lower substrate 201 opposing to the upper substrate (not shown) to define a unit pixel; a gate bus line 200 arranged at the position of bisecting the unit pixel and to be parallel with the storage capacitance bus line 208; a thin film transistor 204 arranged on the gate bus line 200; a counter electrode (not shown) formed in the unit pixel; and a pixel electrode overlapped with the counter electrode to form a fringe field, being electrically in contact with the thin film transistor 204 through a via hole 205.

The pixel electrode 206 includes a frame shaped body unit on the edge in counter electrode (not shown) and a plurality of slant slits arranged with a regular distance to divide the body unit into several parts, forming a predetermined angle with the gate bus line 200. The angle of the slant slits in pixel electrode 206 is symmetric with respect to the gate bus line 200. Here, the slit in the pixel electrode has a width(l) of less than 8 $\mu$m and the distance(w) between the slits is less than 8 $\mu$m. A part of the pixel electrode 206 is eliminated to reduce parasitic capacitance (Cgs) between the source electrode(not shown) of thin film transistor 204 and the gate bus line 200.

The gate bus line 200 has a width of approximately from 10 to 30 $\mu$m, and the storage capacitance bus line 208 has a width of approximately from 10 to 40 $\mu$m. The storage capacitance bus line 208 is overlapped with both the upper edge of pixel electrode in one unit pixel and the lower edge of pixel electrode in the closest unit pixel, thereby having a charging rate sufficient to completely switch the pixel.

And, the storage capacitance bus line 208 and the pixel electrode 206 are overlapped with each other on upper and lower edges in the unit pixel, thereby preventing generation of undesirable electric field and remarkably reducing or eliminating a black matrix on the upper substrate (not shown).

In the drawing, a reference code 210 indicates an imaginary edge line of the black matrix in the unit pixel. It is not required to be formed on the upper substrate (not shown) over the storage capacitance bus line 208 or on the upper substrate (not shown) over the inner parts of unit pixel. The edge of black matrix 210 has a predetermined length less than 5 $\mu$m, overlapped with the edge of pixel electrode 206, thereby preventing generation of light leakage.

When a liquid crystal having positive dielectric anisotropy is employed, it is rubbed to be parallel with the gate bus line 202. On the other hand, when the liquid crystal has negative dielectric anisotropy, it is rubbed to be parallel with the data bus line 202. Therefore, liquid crystal molecules, arranged between the data bus line 202 and the pixel electrode 206, are not operated in applying voltage. That is, it is possible to maintain 'black' state without light leakage and therefore, eliminate black matrix (not shown) from the upper substrate.

The thin film transistor 204 is arranged on the gate bus line 200 and in the unit pixel as a switching device, and a hole is arranged in a predetermined shape, for example, a rectangular shape, on the pixel electrode 206, not overlapped with the pixel electrode, for a correct switching operation. The pixel electrode 206 is contacted electrically with the thin film transistor 204 through the via hole 205.

An upper part of the slant slit patterns in the pixel electrode 206 form counterclockwise an angle of over 0° to 45° and below with respect to the gate bus line 200, while a lower part of the slant slit patterns in the pixel electrode 206 form clockwise an angle of over 0° to 45° and below to be symmetric with the upper part of the slant slit patterns.

In the above-mentioned structure, the data bus line 202 cross-arranged with the gate bus line 200 is formed on the right long side of unit pixel, and the thin film transistor 204 on the gate bus line 200 is arranged on the right long side of the unit pixel, that is, around the data bus line 202.

Although it is not shown in the drawing, it is also possible that the upper part of the slant slit patterns in the pixel electrode 206 form clockwise an angle of over 0° to 45° and below with respect to the gate bus line 200, while a lower part of the slant slit patterns in the pixel electrode 206 form counterclockwise an angle of over 0° to 45° and below to be symmetric with the upper part of the slant slit patterns.

In this structure, the data bus line 202 cross-arranged with the gate bus line 200 is formed on the right long side of unit pixel, and the thin film transistor 204 on the gate bus line 200 is arranged on the right long side of the unit pixel, that is, around the data bus line 202.

Figure 3:
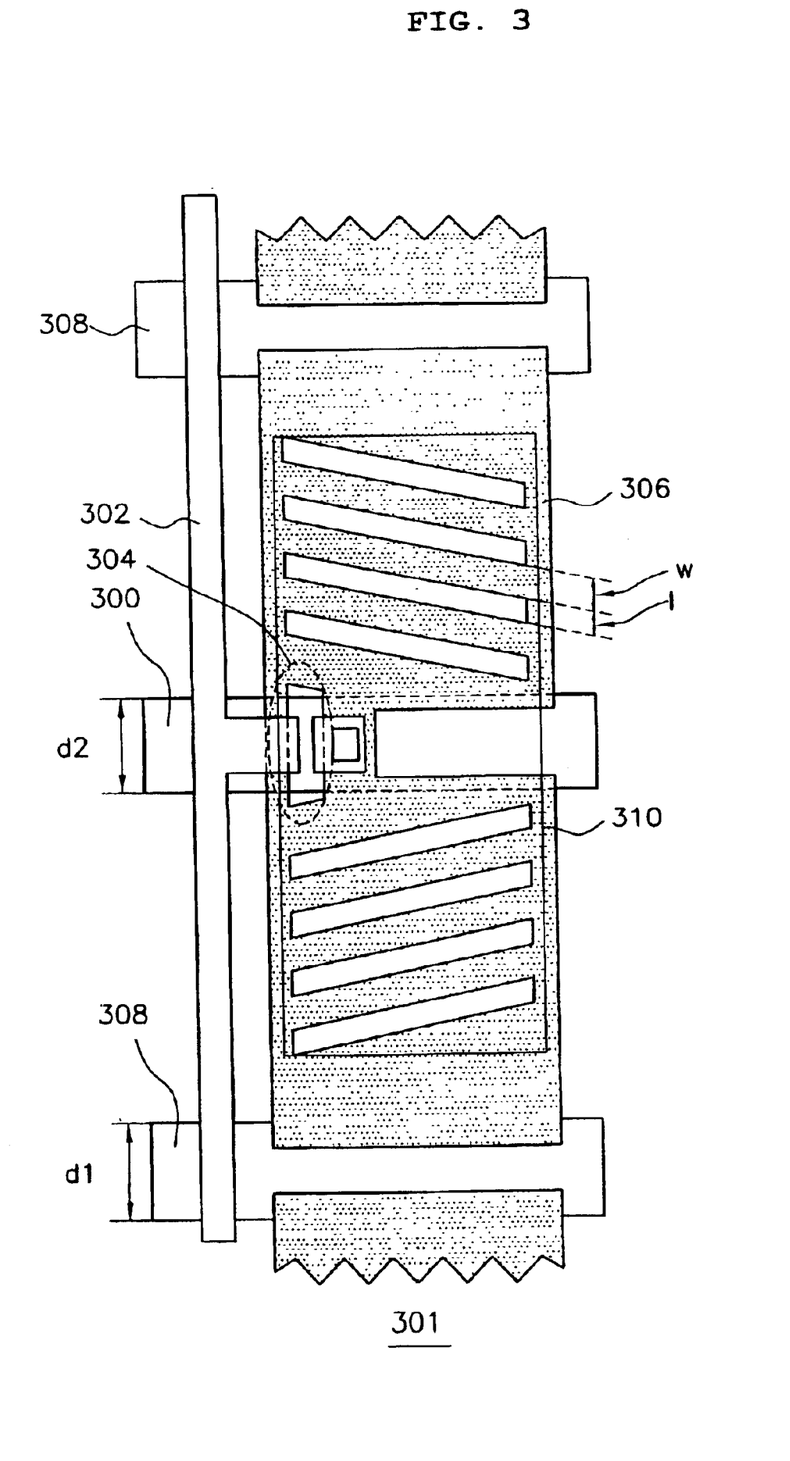

Referring to FIG. 3, it is also possible that the data bus line 302 cross-arranged with the gate bus line 300 is formed on the left long side of unit pixel, and the thin film transistor 304 on the gate bus line 300 is arranged on the left long side of the unit pixel, that is, around the data bus line 302.

Although it is not shown in the drawing, the counter electrode is formed in a rectangular plate shape or comprising a body unit and slant slits as the pixel electrode. In the latter case, the slant slits in the counter electrode is arranged between the slant slits of the pixel electrode or partially overlapped with those of the pixel electrode. Here, the range of the partially overlapped between the slant slits in the counter electrode and the slant slits in the pixel electrode does not exceed 4 $\mu$m.

Although it is not shown in the drawing, polarizing plates are arranged on the rear sides of upper and lower substrates, wherein transmittance axes thereof are cross-arranged and one of the transmittance axes is parallel with the rubbing direction of upper or lower substrate.

Figure 4:
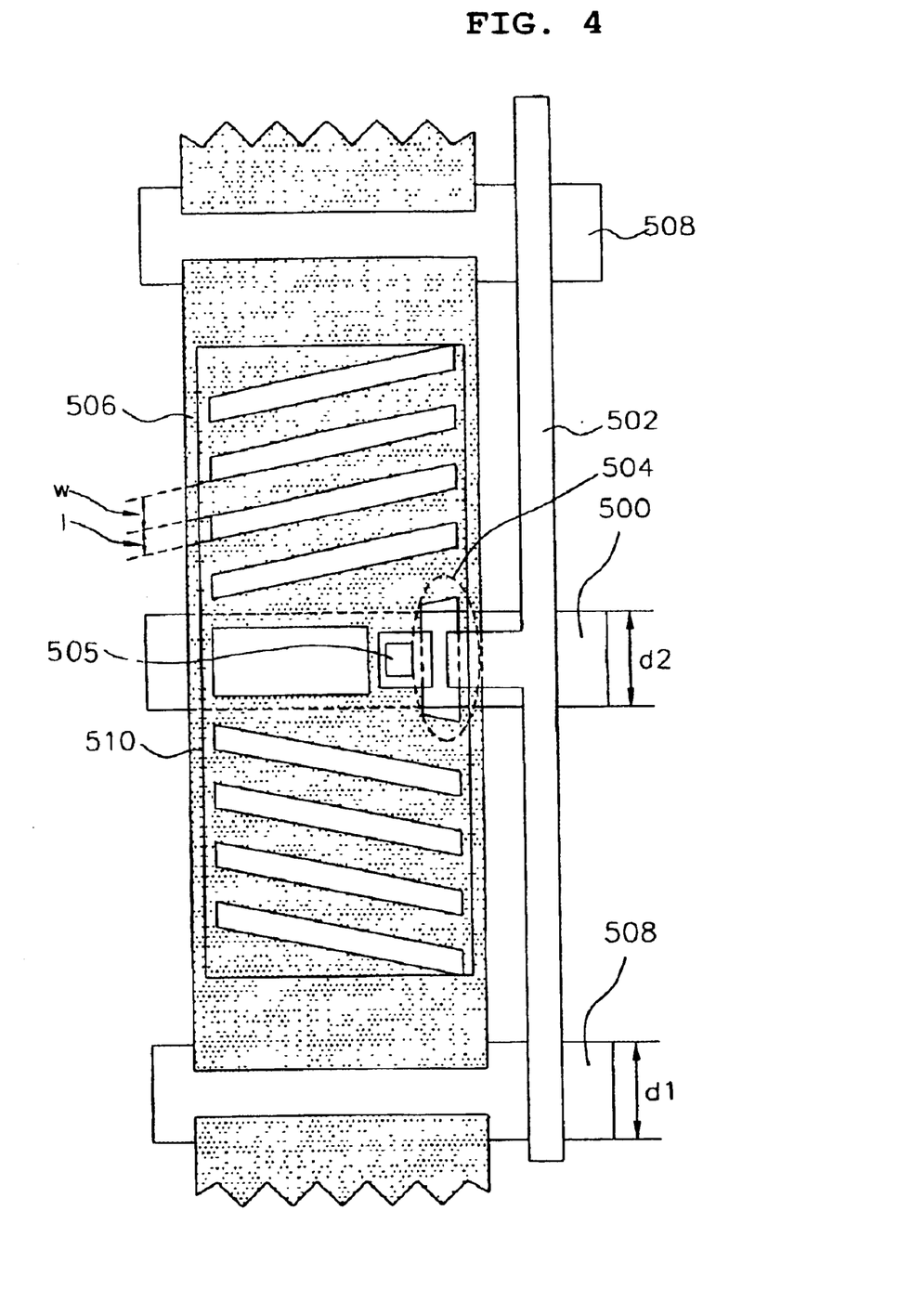
FIG. 4 is a top view of unit pixel in a fringe field switching liquid crystal display device according to another embodiment of the present invention.

FIG. 4 shows another embodiment of the present invention. It has the same structure with FIG. 2 except that a part of the pixel electrode 506 is eliminated to reduce parasitic capacitance (Cgs) in the region where the gate line 500 and the pixel electrode 506 are overlapped.

A method of manufacturing a fringe field switching liquid crystal display according to the present invention will be described in the following.

Figure 5:
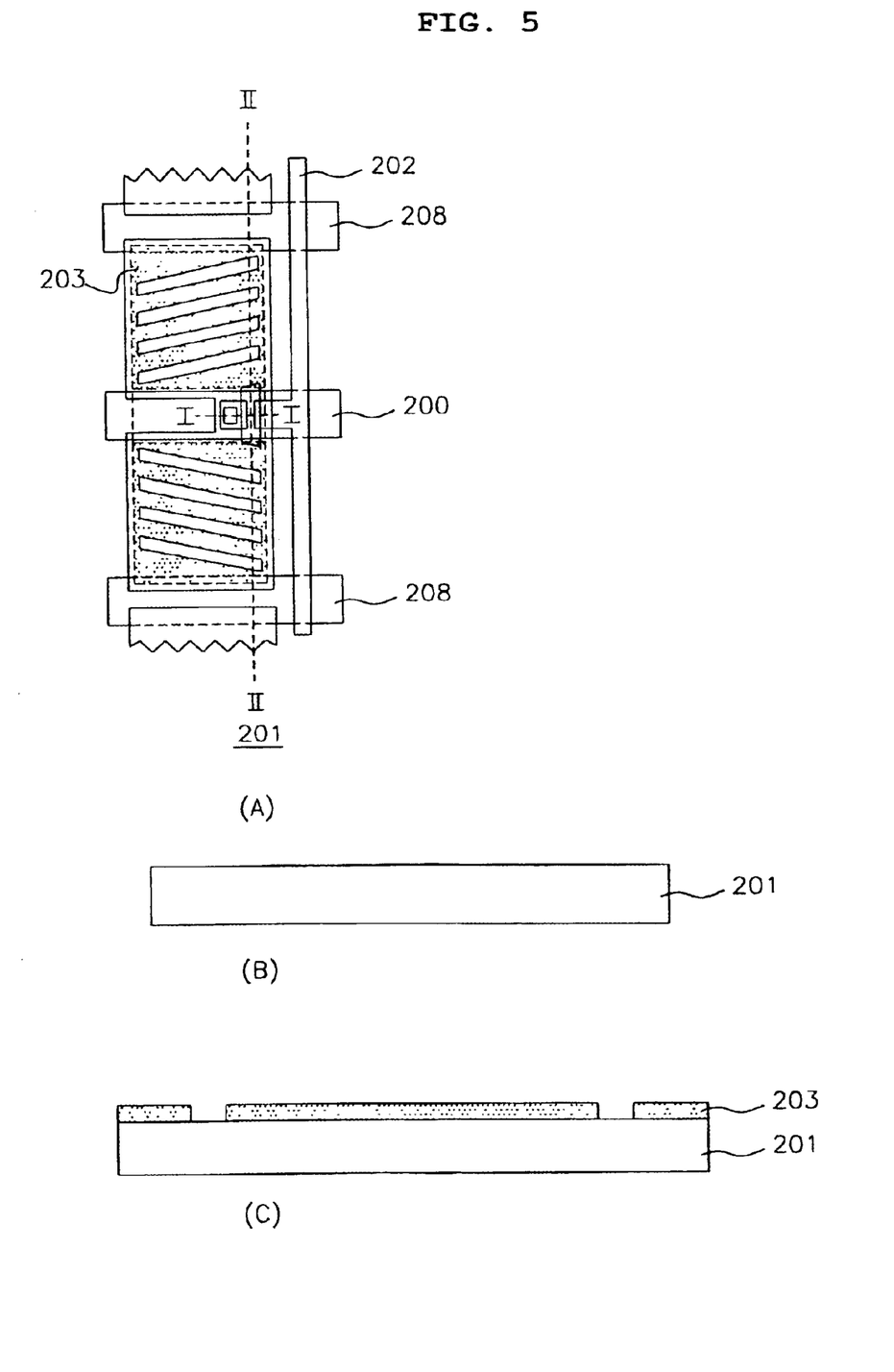
FIG. 5 is a drawing showing a method of forming a counter electrode of fringe field switching liquid crystal display device according to the present invention.

Referring to FIG. 5, a counter electrode 203 is formed of transparent conductor such as ITO on a transparent insulating substrate 201 such as glass. FIG. 5B shows the cross section of FIG. 5A by I—I line and FIG. 5C shows that by II—II line (It is also applied in FIGS. 6 to 11). As shown in the drawing, the counter electrode 203 is formed on the substrate 201 except the region where a gate line 200 is to be formed.

Figure 6:
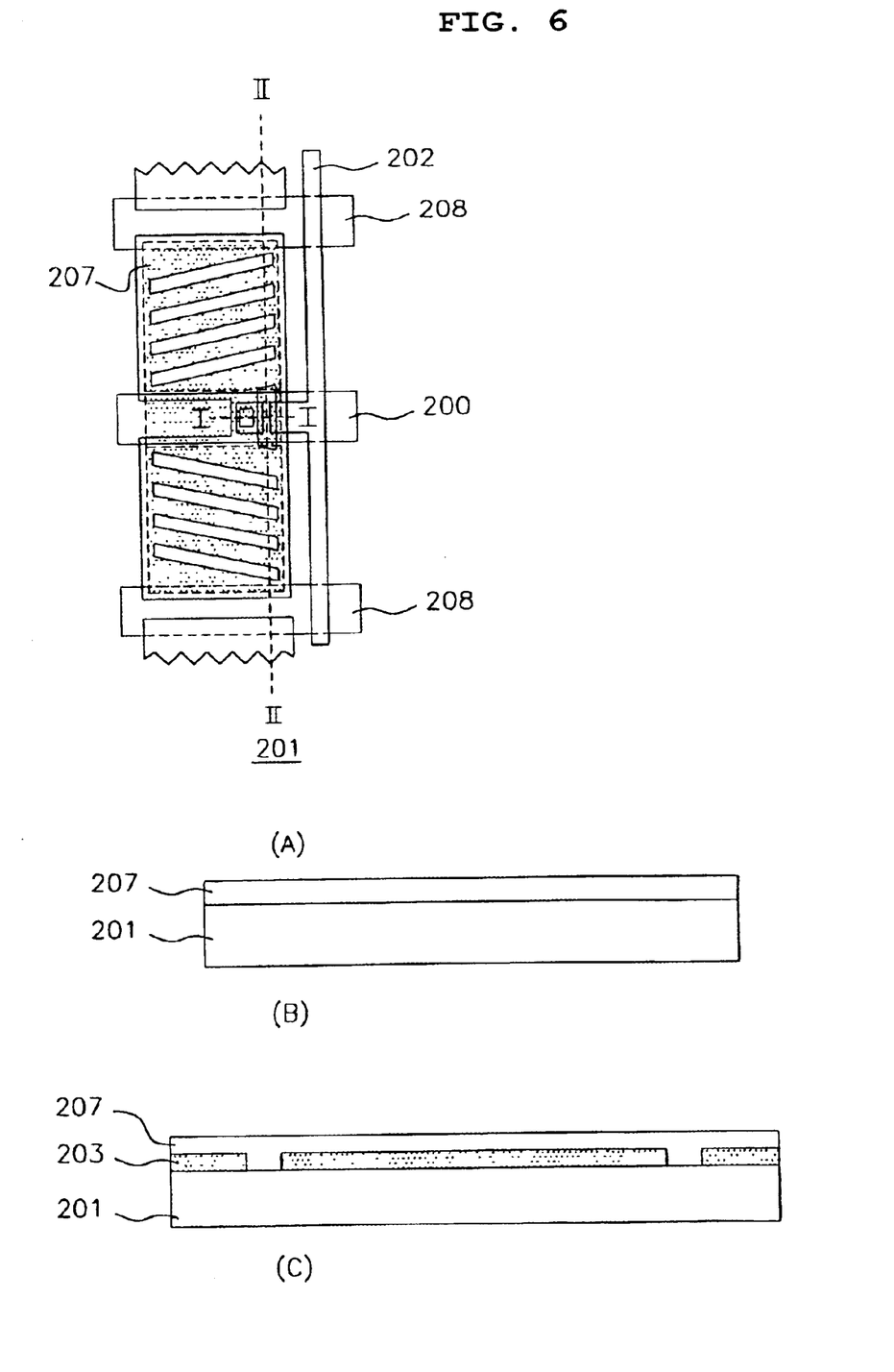
FIG. 6 is a drawing showing a method of forming an insulating layer on the counter electrode of fringe field switching liquid crystal display device according to the present invention.

Referring to FIG. 6, an insulating layer 207 may be additionally formed on the substrate 201 having the counter electrode 203.

Figure 7:
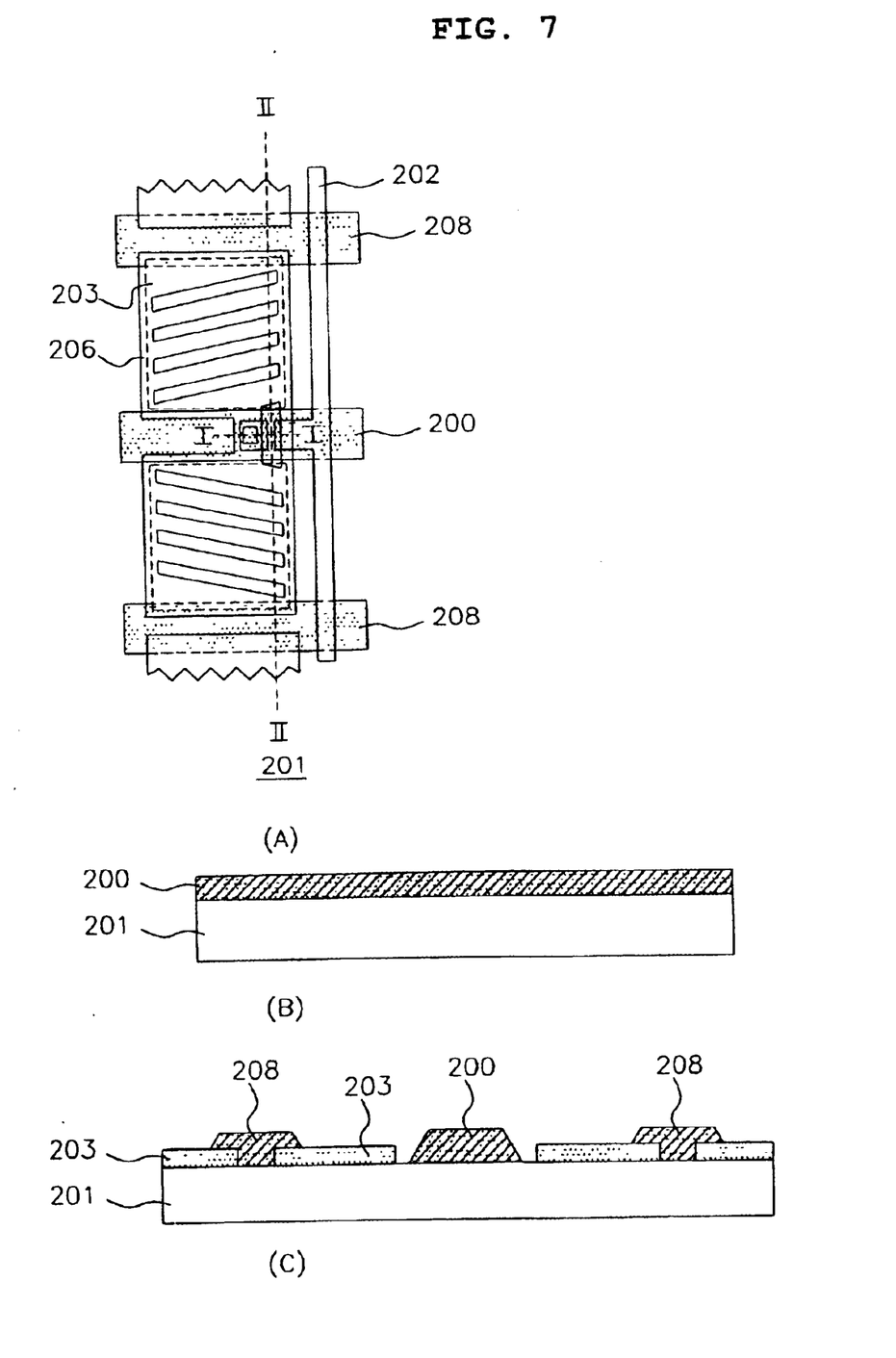
FIG. 7 is a drawing showing a method of forming a gate bus line and a storage capacitance bus line of fringe field switching liquid crystal display device according to the present invention.

Subsequently, as shown in FIG. 7, a gate bus line 200 and a storage capacitance bus line 208 are formed on the substrate 201. FIG. 7C shows the cross section of FIG. 7A by II—II line, wherein the gate bus line 200 is arranged on the center of the substrate 201 and the counter electrode 203 is arranged on both sides thereof. Between the counter electrodes 203, the storage capacitance bus line 208 is formed to apply a part of the counter electrode 203.

The gate bus line 200 and the storage capacitance bus line 208 are formed of one selected from a group comprising molybdenum-tungsten alloy (MoW), aluminum-neodymium alloy (AlNd) and an opaque metal having a stacked structure of molybdenum/aluminum (Mo/Al). The storage capacitance bus line 208 is formed on upper and lower outer sides of unit pixel and the gate bus line 200 is arranged at the position of bisecting the unit pixel. The unit pixel is defined by the upper and lower storage capacitance bus lines 208 and a data bus line 202 to be formed in the following step.

Figure 8:
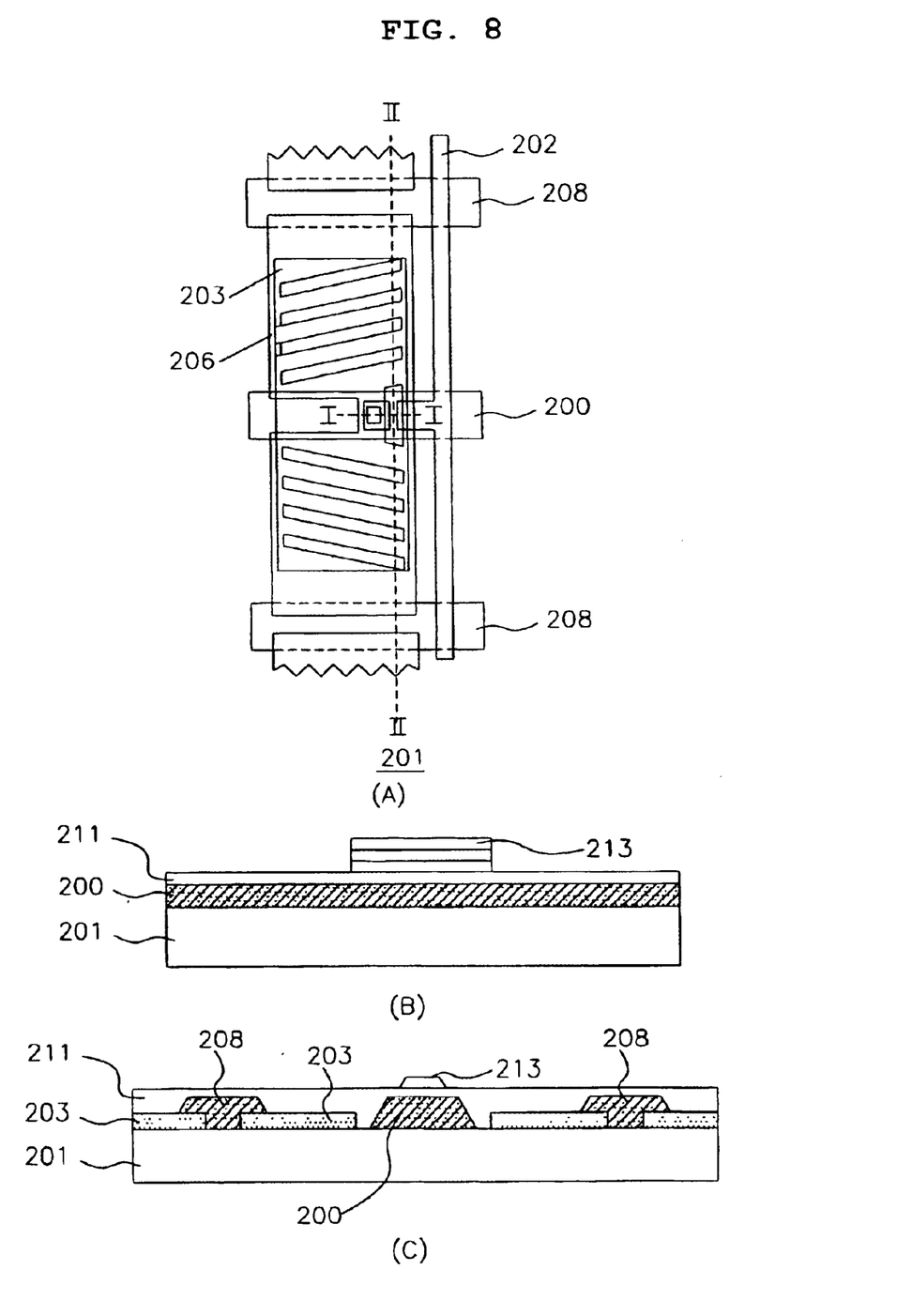
FIG. 8 is a drawing showing a method of forming an active layer of fringe field switching liquid crystal display device according to the present invention.

Referring to FIG. 8, an insulating layer 211 is formed of silicon oxide such as SiON on the gate bus line 200 and the storage capacitance bus line 208 and an active layer 213 is formed on the gate bus line 200. The active layer 213 is formed in stacking shape by depositing silicon nitride, amorphous silicon and doped amorphous silicon (SiN/a-Si/ n+ a-Si) continually.

Figure 9:
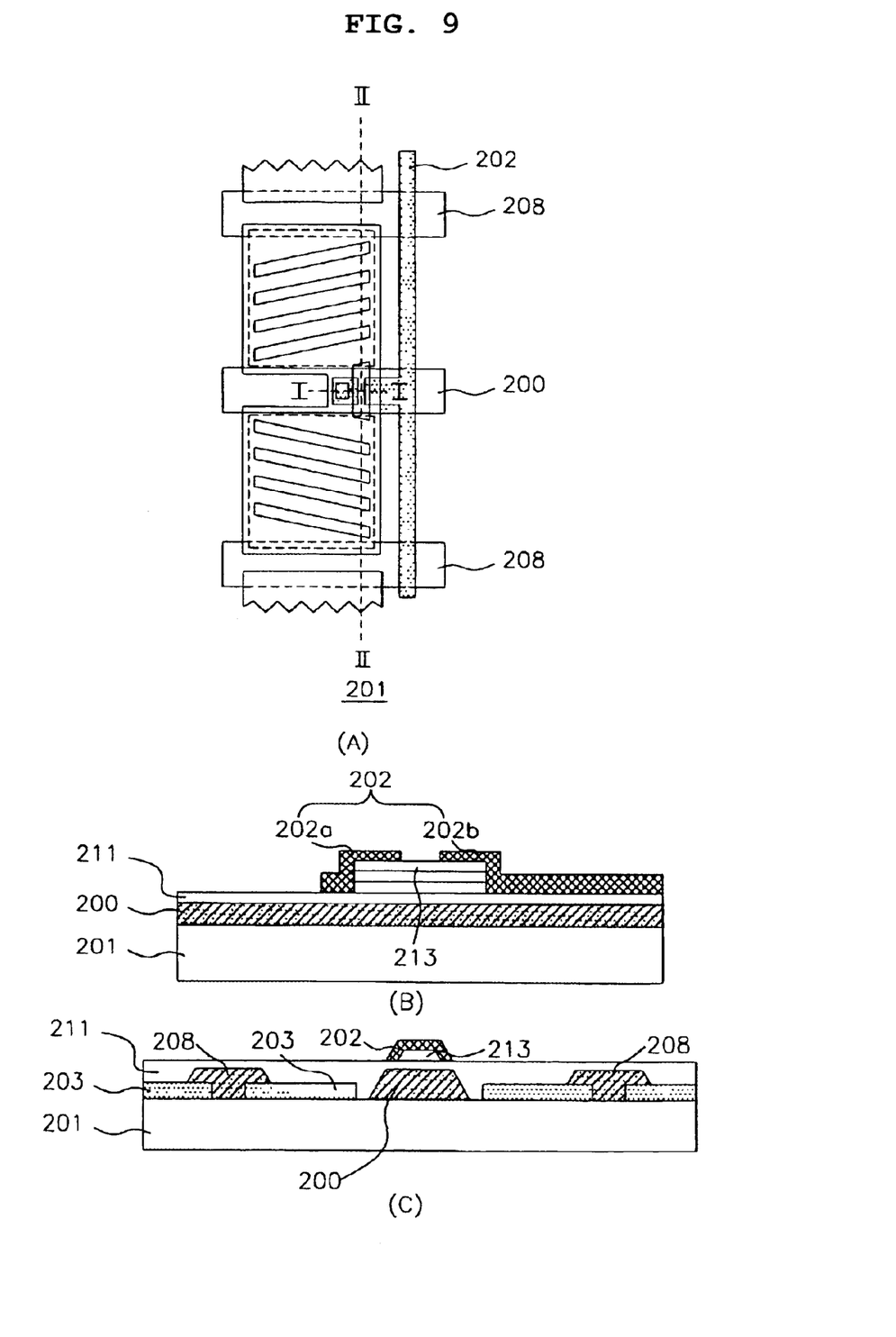
FIG. 9 is a drawing showing a method of forming a data bus line and source/drain electrodes of fringe field switching liquid crystal display device according to the present invention.

Referring to FIG. 9, a data bus line 202 is formed on the insulating layer 211 having the active layer 213. On the active layer 213, source/drain electrodes 202$a$, 202$b$ are formed, extended from the data bus line 202. The data bus line 202 is also formed of one selected from a group comprising molybdenum-tungsten alloy (MoW) and an opaque metal having a stacked structure of molybdenum/ aluminum (Mo/Al).

Figure 10:
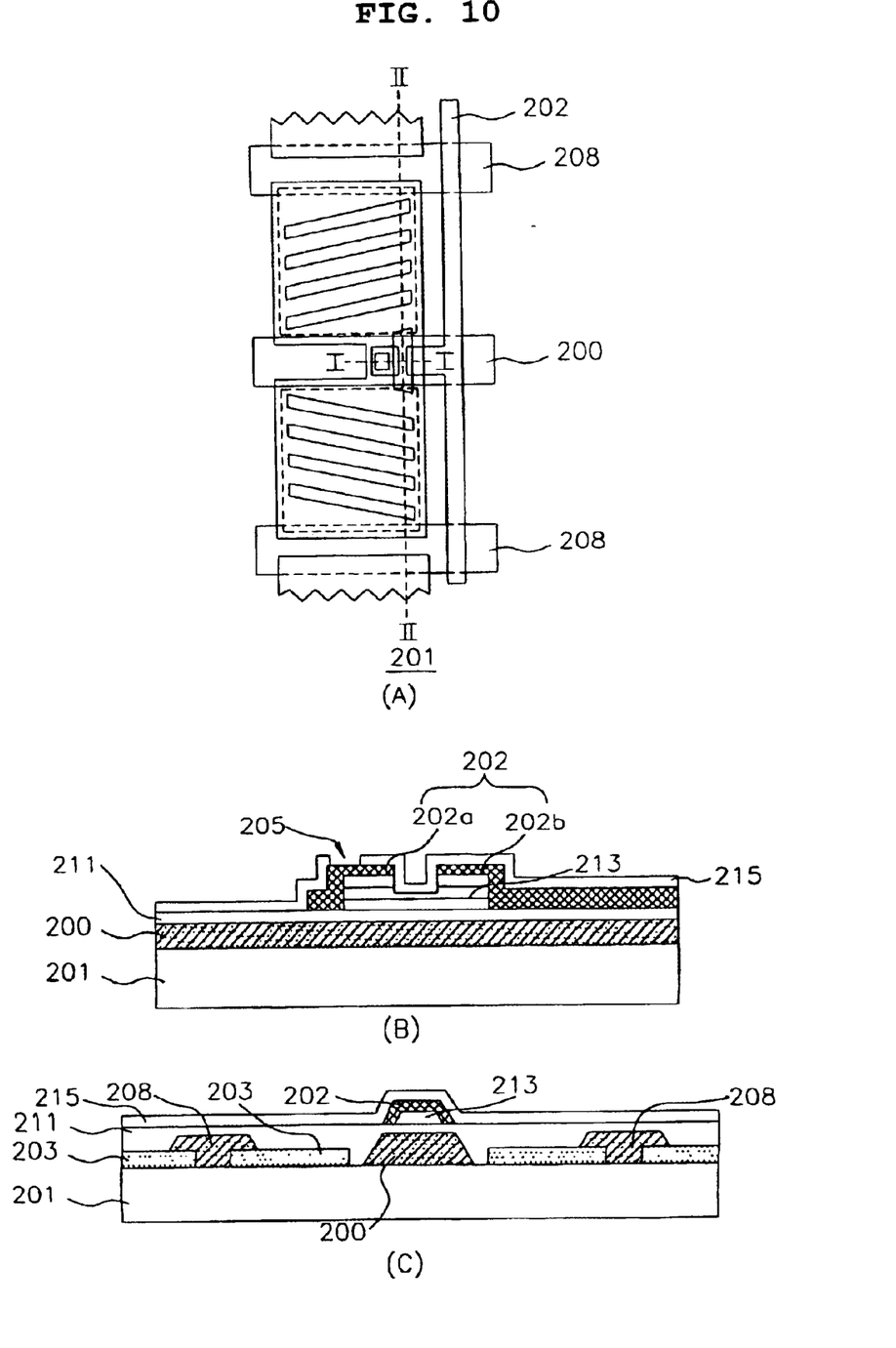
FIG. 10 is a drawing showing a method of forming a protective layer and a via hole of fringe field switching liquid crystal display device according to the present invention.

Referring to FIG. 10, a protective layer 215 is formed of silicon nitride such as SiN on the insulating layer 211 having the data bus line 202 and source/drain electrodes 202$a$, 202$b$, and then, the layer 215 is selectively removed to form a via hole 205 exposing a part of source electrode 202$a$ on the lower portion.

Figure 11:
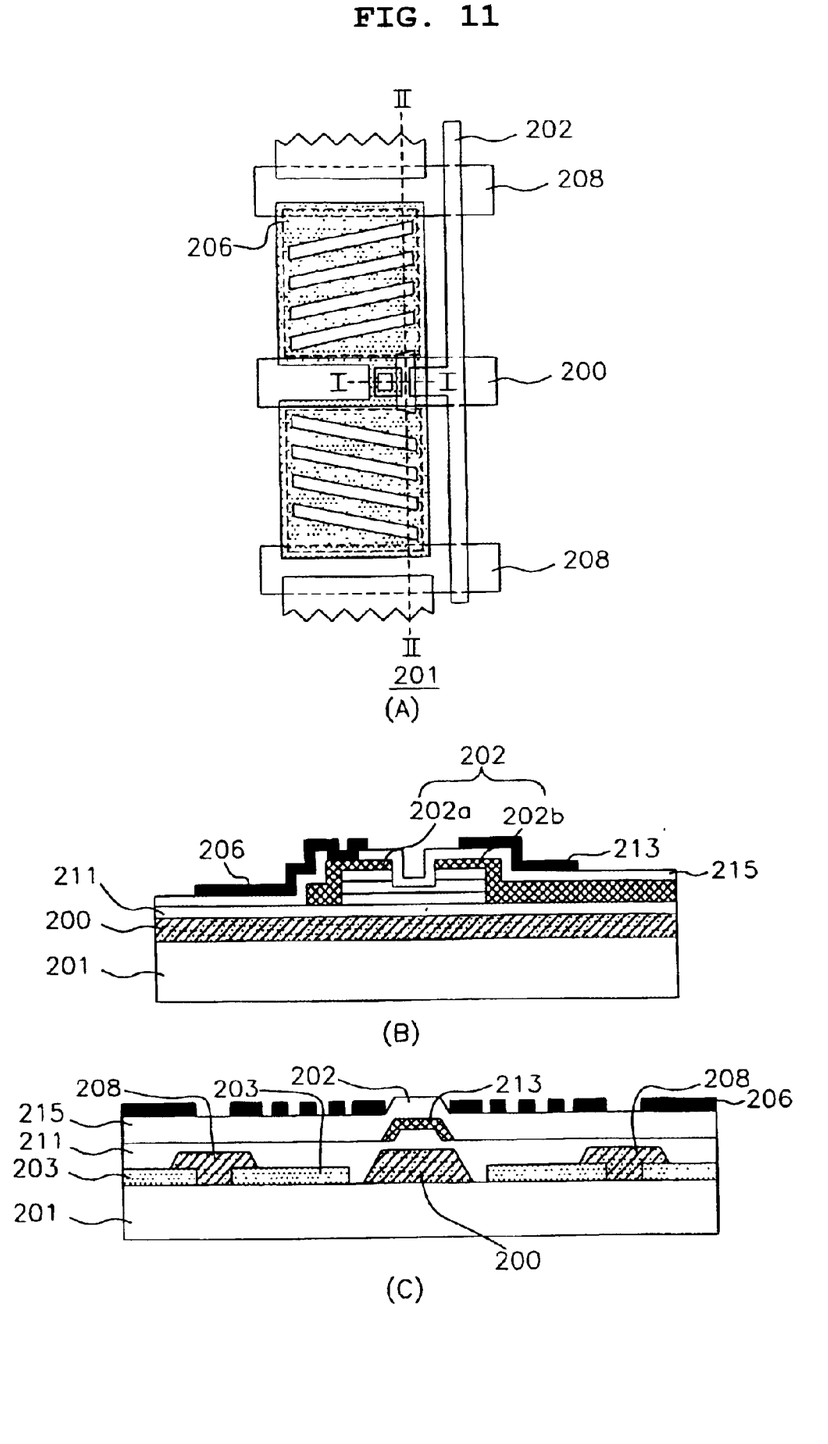
FIG. 11 is a drawing showing a method of forming a pixel electrode of fringe field switching liquid crystal display device according to the present invention.

Referring to FIG. 11, a pixel electrode 206 is formed in a slit shape, with a transparent conductor ITO on the protective layer 215, thereby completing a fringe field switching liquid crystal display device according to the present invention.

As described above, according to the present invention, the gate bus line is arranged on the center in the unit pixel to eliminate light leakage due to electric field between the gate bus line and the data bus line. Therefore, it is possible to prevent color shift and eliminate or reduce light leakage, thereby reducing black matrix. As a result, the present invention has an improved aperture ratio and transmittance.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A fringe field switching liquid crystal display device comprising:
    an upper substrate;
    a lower substrate opposing the upper substrate;
    a data bus line arranged on the lower substrate intersecting a pair of substantially parallel storage capacitance bus lines arranged on the lower substrate to substantially define a unit pixel;
    a gate bus line arranged in the direction substantially parallel to the storage capacitance bus lines in between the storage capacitance bus lines, thereby substantially bisecting the unit pixel;
    a thin film transistor arranged on the gate bus line;
    a counter electrode formed in the unit pixel; and
    a pixel electrode overlapped with the counter electrode on the same substrate to form a fringe field and electrically contacted with the thin film transistor through a via hole;
        wherein the pixel electrode comprises a frame shaped body unit on the edge of counter electrode and a plurality of slant slits arranged with a regular distance to divide the body unit into several parts, forming a predetermined angle with the gate bus line, and the angle of slant slits in the pixel electrode is symmetric with respect to the gate bus line, and the storage capacitance bus line is partially overlapped with both the upper edge of pixel electrode in one unit pixel and the lower edge of pixel electrode in the closest unit pixel.

2. The fringe field switching liquid crystal display device according to claim 1, wherein the gate bus line has a width of from 10 to 30 $\mu$m.

3. The fringe field switching liquid crystal display device according to claim 1, wherein the storage capacitance bus line has a width of from 10 to 40 $\mu$m.

4. The fringe field switching liquid crystal display device according to claim 1. wherein the upper substrate has a black matrix on the inner side and the edge thereof is overlapped with the edge of pixel electrode by 0 to 5 $\mu$m.

5. The fringe field switching liquid crystal display device according to claim 1. wherein the pixel electrode has a hole not to be overlapped with the thin film transistor.

6. The fringe field switching liquid crystal display device according to claim 1, wherein an upper part of the slant slit patterns in the pixel electrode form counterclockwise an angle of over 0° to 45° and below with respect to the gate bus line, while a lower part of the slant slit patterns in the pixel electrode form clockwise an angle of over 0° to 45° and below to be symmetric with the upper part of the slant slit patterns.

7. The fringe field switching liquid crystal display device according to claim 6, wherein the data bus line cross-arranged with the gate bus line is arranged on the right long side in the unit pixel and the thin film transistor on the gate bus line is arranged on the right long side in the unit pixel.

8. The fringe field switching liquid crystal display device according to claim 6 wherein the slit in the pixel electrode has a width of less than 8 μm.

9. The fringe field switching liquid crystal display device according to claim 6 wherein the distance between the slits of the pixel electrode is less than 8 μm.

10. The fringe field switching liquid crystal display device according to claim 1, wherein an upper pert of the slant slit patterns in the pixel electrode form counterclockwise an angle of over 0° to 45° and below with respect to the gate bus line, while a lower part of the slant slit patterns in the pixel electrode form clockwise an angle of over 0° to 45° and below to be symmetric with the upper part of the slant slit pattern.

11. The fringe field switching liquid crystal display device according to claim 8, wherein the data bus line cross-arranged with the gate bus line is arranged on the left long side in the unit pixel and the thin film transistor on the gate bus line is arranged on the left long side in the unit pixel.

12. The fringe field switching liquid crystal display according to claim 1, wherein the counter electrode is a transparent electrode having a rectangular plate shape or a transparent electrode comprising a frame shaped body unit and a plurality of slant slits arranged with a regular distance to divide the body unit into several parts, forming a predetermined angle with the gate bus line.

13. The fringe field switching liquid crystal display device according to claim 12, wherein the slant slits in the counter electrode is arranged between the slant slits of the pixel electrode or partially overlapped with those of the pixel electrode.

14. The fringe field switching liquid crystal display device according to claim 13, wherein the range of the partially overlapped between the slant slits in the counter electrode and the slant slits in the pixel electrode does not exceed 4 μm.

15. A method of manufacturing a fringe field switching liquid crystal display device comprising the steps of:

forming a counter electrode on a transparent insulating substrate;

forming a pair of substantially parallel storage capacitance bus lines on the transparent insulating substrate having the counter electrode, wherein a selected portion of the area formed between the two storage capacitance bus lines and having the counter electrode therein is defined as a unit pixel;

forming a gate bus line running substantially parallel with the storage capacitance bus lines in between the two storage capacitance bus lines thereby substantially bisecting the unit pixel;

forming an insulating layer on the transparent insulating substrate having the gate bus line and the storage capacitance bus lines and then, forming an active layer on the insulating layer over the gate bus line;

forming a data bus line and source/drain electrodes extended from the data bus line on the insulating layer having the active layer;

forming a protective layer on the source/drain electrodes and the data bus line and then, forming a via hole exposing a part of the source electrode; and forming a pixel electrode comprising slits and being in contact with the source electrode through the via hole.

16. The method of manufacturing a fringe field switching liquid crystal display device according to claim 15, further comprising the step of forming an insulating layer on the transparent insulating substrate having the counter electrode between the steps of forming the counter electrode and forming the storage capacitance bus line and the gate bus line.

17. The method of manufacturing a fringe field switching liquid crystal display device according to claim 15, wherein the gate bus line is formed of one selected from a group comprising molybdenum-tungsten alloy, aluminum-neodymium alloy and oblique metal having a stacked structure of molybdenum/aluminum.

18. The method of manufacturing a fringe field switching liquid crystal display device according to claim 15, wherein the storage capacitance bus line is formed of one selected from a group comprising molybdenum-tungsten alloy, aluminum-neodymium alloy and oblique metal having a stacked structure of molybdenum/aluminum.

19. The method of manufacturing a fringe field switching liquid crystal display device according to claim 15, wherein the active layer is formed in stacking shape by depositing silicon nitride, amorphous silicon and doped amorphous silicon continually.

20. The method of manufacturing a fringe field switching liquid crystal display device according to claim 15, wherein the data bus line is formed of one selected from a group comprising molybdenum-tungsten alloy and oblique metal having a stacked structure of molybdenum/aluminum.

* * * * *